US006115762A

United States Patent [19]

Bell et al.

[11] Patent Number: 6,115,762

[45] Date of Patent: Sep. 5, 2000

[54] PC WIRELESS COMMUNICATIONS UTILIZING AN EMBEDDED ANTENNA COMPRISING A PLURALITY OF RADIATING AND RECEIVING ELEMENTS RESPONSIVE TO STEERING CIRCUITRY TO FORM A DIRECT ANTENNA BEAM

[75] Inventors: Russell Bell; Saf Asghar; Yan Zhou, all of Austin, Tex.

[73] Assignee: Advanced Micro Devices, Inc., Sunnyvale, Calif.

[21] Appl. No.: 08/915,766

[22] Filed: Aug. 21, 1997

Related U.S. Application Data

[60] Provisional application No. 60/039,066, Mar. 7, 1997.

[51] Int. Cl.[7] .................... G06F 13/14

[52] U.S. Cl. .................... 710/62; 343/702; 343/846; 361/686; 439/64

[58] Field of Search .................... 235/472, 492; 343/700 MS, 702, 846, 702.6; 361/737, 686; 395/882; 710/62; 439/64

[56] References Cited

U.S. PATENT DOCUMENTS

| | | | |
|---|---|---|---|
| 4,830,006 | 5/1989 | Haluska et al. | 128/419 PG |
| 4,855,583 | 8/1989 | Fraser et al. | 235/492 |
| 5,138,328 | 8/1992 | Zibrik et al. | 343/702 |
| 5,349,139 | 9/1994 | Verrier et al. | 178/19 |
| 5,408,241 | 4/1995 | Shattuck et al. | 343/700 MS |
| 5,590,346 | 12/1996 | West et al. | 455/348 |
| 5,608,606 | 3/1997 | Blaney | 361/686 |
| 5,640,002 | 6/1997 | Ruppert et al. | 235/472 |
| 5,657,028 | 8/1997 | Sanad | 343/700 MS |
| 5,680,144 | 10/1997 | Sanad | 343/700 MS |
| 5,708,833 | 1/1998 | Kinney et al. | 395/800 |
| 5,739,791 | 4/1998 | Barefield et al. | 343/702 |
| 5,856,912 | 1/1999 | Miller et al. | 361/737 |
| 5,970,393 | 10/1999 | Khorrami et al. | 455/66 |
| 6,005,519 | 12/1999 | Burns | 343/700 MS |

OTHER PUBLICATIONS

Sanad, Mohamed S. Partially Shorted Double Ring Microstrip Antenna Having A Microstrip Feed, Feb. 15, 1996, International Application Publishe #WO9604691.

*Reference Data for Radio Engineers*, ITT Publishers, ISBN 0–672–21218–8, Library of Congress No. 75–28960, 1981, pp. 24–24–24–27.

*Primary Examiner*—Thomas C. Lee
*Assistant Examiner*—Abdelmoniem Elamin
*Attorney, Agent, or Firm*—Foley & Lardner

[57] ABSTRACT

A computing device, such as a laptop personal computer (PC), a desktop PC, or a personal information device (PID), includes an antenna embedded therein for wireless communications. The antenna may be formed on a printed circuit board installed in the computing device. The antenna may include multiple radiating and receiving elements for mitigating multipath effects and/or responding to steering circuitry to form a directed antenna beam.

10 Claims, 3 Drawing Sheets

PC WIRELESS COMMUNICATIONS UTILIZING AN EMBEDDED ANTENNA COMPRISING A PLURALITY OF RADIATING AND RECEIVING ELEMENTS RESPONSIVE TO STEERING CIRCUITRY TO FORM A DIRECT ANTENNA BEAM

This application claims benefit of provisional application 60/039,066 filed Mar. 7, 1997.

BACKGROUND OF THE INVENTION

1. Field of the Invention

The invention relates to wireless communications for computing devices. More particularly, the invention relates to such communication utilizing an embedded antenna.

2. Related Art

Conventional wireless communications to or from personal computers (PCs) occurs through external devices. PCs typically use some form of connection to an external radio frequency (RF) module and an antenna for connectivity to various radio systems, which may include, for example, cellular, Personal Communication Services (PCS), wireless local area networks (LANs, i.e. 802.11), and wireless wide area networks (WANs).

The external module functions as a receiver, a transmitter, and/or a demodulator. Conventionally, the external module includes an antenna for transmitting and receiving signals. A single antenna is typically used for both transmitting and receiving.

Laptop computers that require wireless connectivity rely on the addition of a Personal Computer Memory Card International Association (PCMCIA) communication card that is inserted into a PCMCIA slot for connection to the laptop PC buses. The radio electronics and antenna may reside on the PCMCIA card or may require a further connection to an external antenna that does not reside on the PCMCIA card.

FIG. 1A shows conventional wireless communications between PCs and a printer. Laptop PC 120 communicates with desktop PC 130 and printer 140 through external PCMCIA card 124 with external antenna 128. Desktop PC 130 communicates with laptop PC 120 and printer 140 through external module 134 with external antenna 138. Printer 140 communicates with laptop PC 120 and desktop PC 130 through external module 144 with external antenna 148.

FIG. 1B shows a similar configuration to FIG. 1A wherein the communication circuitry is internal, for example, on a printed circuit board. However, laptop PC 120, desktop PC 130, and printer 140 still utilize external antennas 128, 138, and 148, respectively.

SUMMARY OF THE INVENTION

It is an object of the invention to provide PC wireless communications without utilizing an external device. Specifically, it is an object of the invention to provide PC wireless communications without utilizing either an external module or an external antenna. A further object of the invention is to provide improved PC wireless communications.

The above and other objects of the invention are accomplished by a computing device which includes an antenna embedded therein to receive and/or transmit information from/to an other device in the absence of a connection to the other device.

In a first embodiment according to the invention, the antenna is formed in a printed circuit board embedded in the computing device.

In a second embodiment according to the invention, the antenna is formed on the mounting bracket of a printed circuit board.

In a third embodiment according to the invention, the antenna is formed in a region of a display of the computing device.

In a fourth embodiment according to the invention, the antenna includes a number of radiating and receiving elements to improve PC wireless communication. For example the antenna may be responsive to steering circuitry to form a directed antenna beam. Additionally, for example, the antenna may also operate as part of a diversity system to minimize the impact of multipath propagation.

The embedded antenna according to the invention may also accomplish improved PC wireless communications through frequency reuse techniques.

BRIEF DESCRIPTION OF THE DRAWINGS

These and other objects and advantages of the invention will be apparent from a review of the specification in light of the drawings, wherein.

DETAILED DESCRIPTION OF THE PREFERRED EMBODIMENTS

According to the invention, RF communications and/or wireless connectivity are accomplished without connection to an external device or antenna by embedding an antenna inside or on the surface of a computing device such as a personal computer. One method according to the invention employs microstrip or strip-line techniques in conjunction with printed circuit boards to form an antenna. The antenna formed thereby may be designed to exhibit various predetermined characteristics, including, for example, a specified gain or loss, bandwidth, and/or pattern (i.e. for beam steering). The antenna may be formed on a separate printed circuit board or it may be integrated or “embedded” into an existing circuit board and subsequently installed within a computing device such as a portable or desktop PC or personal information device (PID). This allows RF signals to be radiated from the computing device and signals to be received at the computing device without physically connecting to external devices.

Microstrip and strip-line techniques are well known in the antenna art and are described more fully in *Reference Data for Radio Engineers,* ITT publishers, ISBN 0-672-21218-8, Library of Congress No. 75-28960, incorporated herein by reference (hereinafter “Reference Data for Radio Engineers).

Figure 1A:
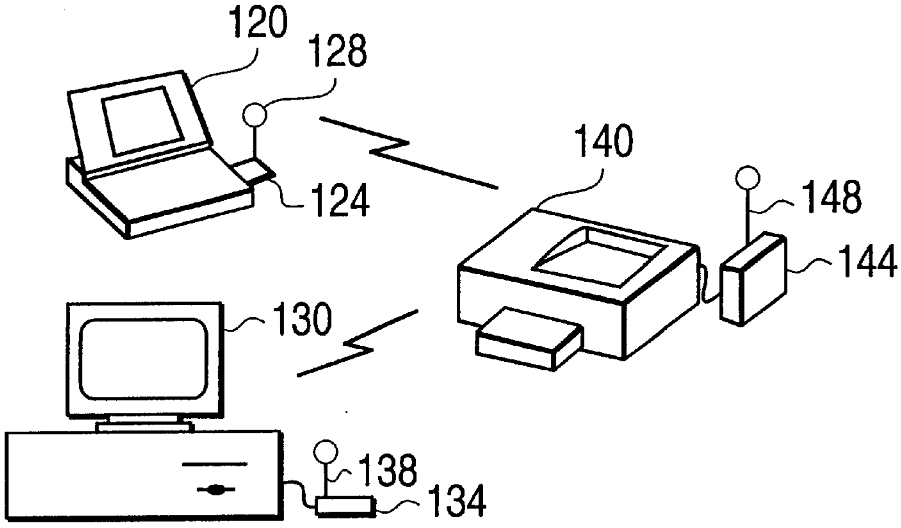
FIG. 1A (PRIOR ART)
FIGS. 1A and 1B show conventional wireless communications between PCs and a printer.
Figure 1B:
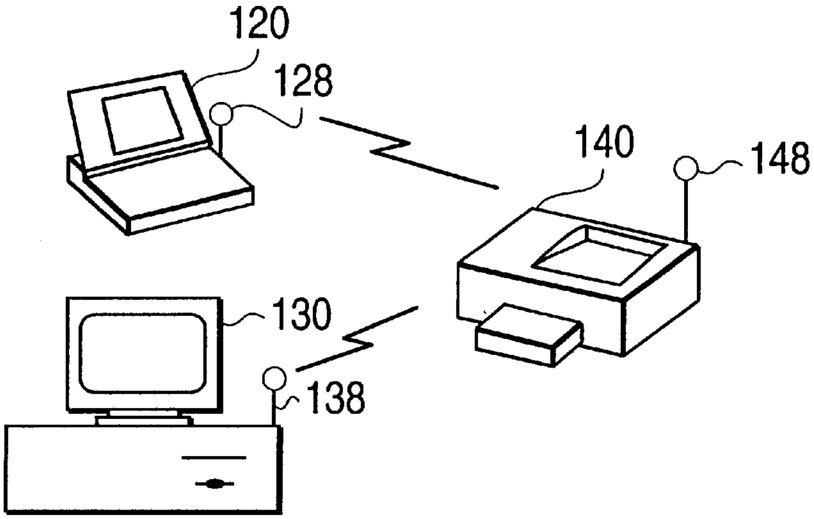
FIG. 1B (PRIOR ART)
Figure 2:
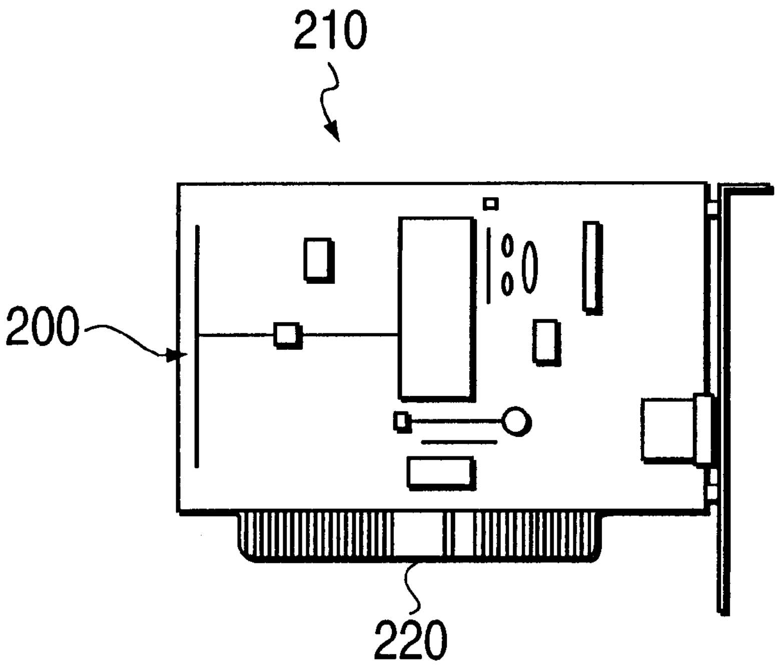
FIG. 2 shows a first embodiment according to the invention wherein a printed circuit board has an embedded antenna.

FIG. 2 shows a first embodiment according to the invention wherein a printed circuit board has an embedded antenna. As illustrated in FIG. 2, an embedded antenna 200 is formed as a dipole antenna on a printed circuit board 210 via stripline techniques. The printed circuit board 210 may be a communications board with a direct connection to the embedded antenna 200. In another example, the printed circuit board 210 may be a pre-existing board of a computing device. In this example, the connection between the embedded antenna 200 and its associated communications circuitry may be made through the connector 220 on the printed circuit board 210 and the computing device's internal wiring. Alternatively, a cable or other electrical conductor may be used to connect the embedded antenna 200 to the appropriate communications circuitry.

Figure 3:
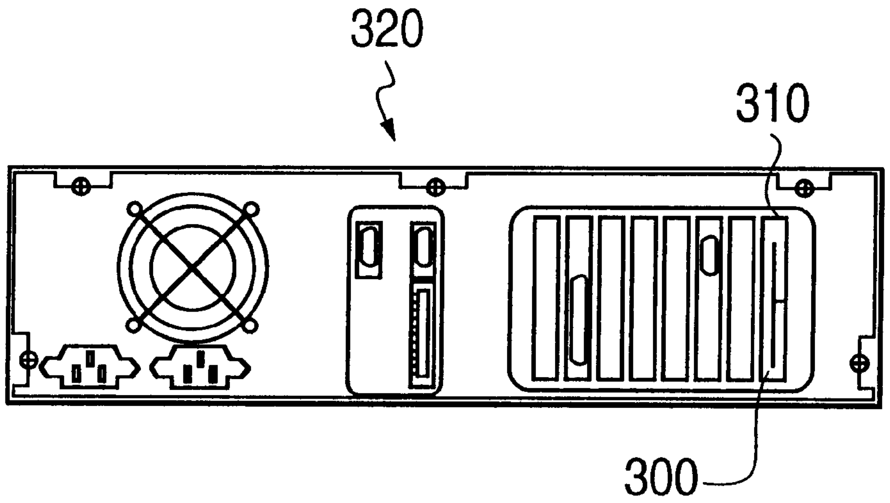
FIG. 3 shows a second embodiment according to the invention wherein a mounting bracket of a printed circuit board has an embedded antenna.

FIG. 3 shows a second embodiment according to the invention from the back side of a conventional desktop PC case. An embedded antenna 300 is formed on mounting bracket 310 of a printed circuit board which is installed in a desktop PC 320. Connection from the embedded antenna 300 to its associated communications circuitry may be made as described above with respect to the first embodiment.

Figure 4:
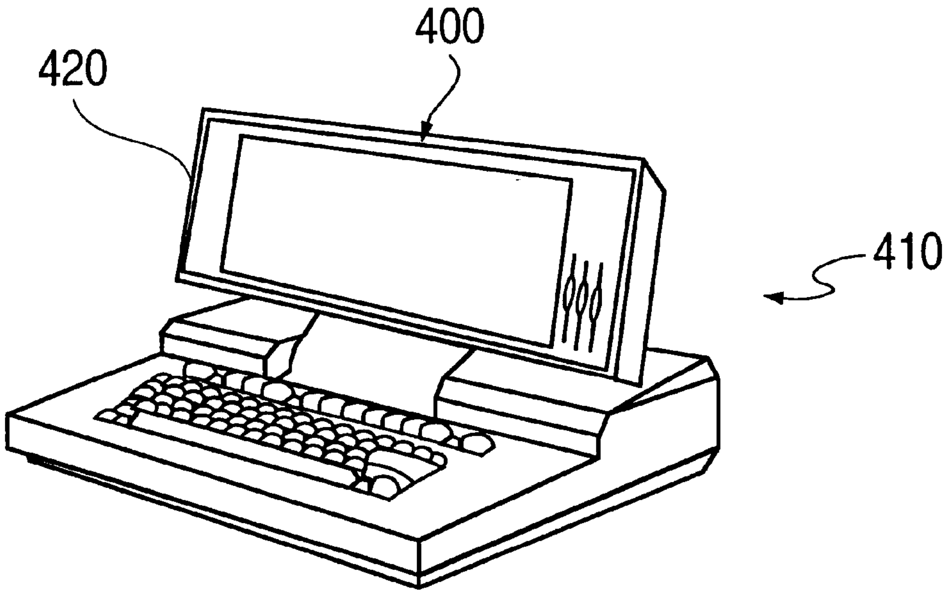
FIG. 4 shows a third embodiment according to the invention wherein a laptop PC has an embedded antenna.

FIG. 4 shows a third embodiment according to the invention wherein a portable computer 410, for example, a laptop PC, has an embedded antenna 400. In the example of a portable computer 410, the embedded antenna 400 is preferably located in the region of the screen.

In a typical laptop PC, the user begins operation by raising the screen to a viewable position. When this occurs, the orientation of the embedded antenna, which may be formed on an outside surface of the display portion or placed on a circuit board or series of circuit boards inside the display portion, would be positioned to operate in an efficient manner for transmission and reception.

As shown in FIG. 4, the embedded antenna 400 is formed on an outer surface of a display portion 420 of the portable computer 410. Connection to the embedded antenna 400 may be made through the display portion casing. In another example, the antenna could be embedded on a printed circuit board mounted within the casing.

Figure 5:
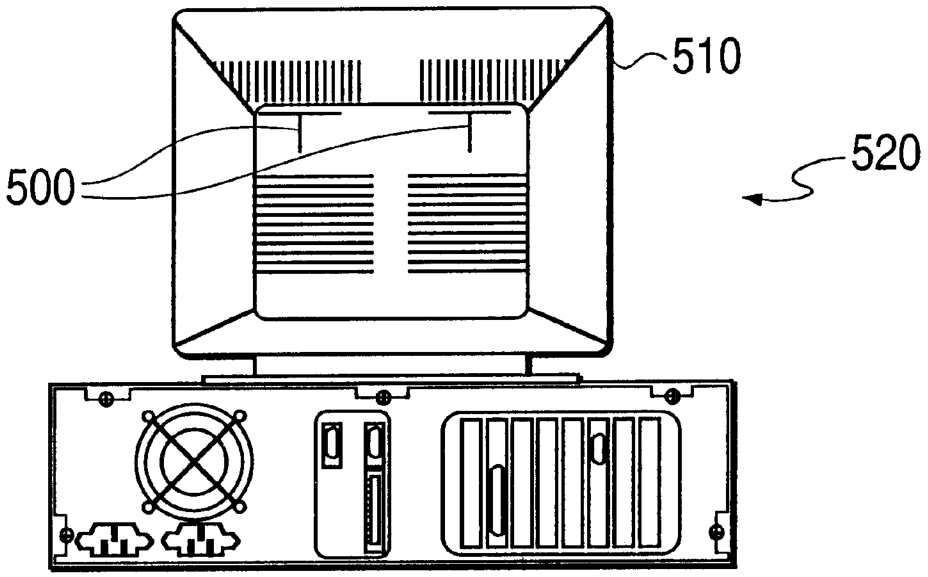
FIG. 5 shows a fourth embodiment according to the invention wherein a desktop PC has an embedded antenna with multiple radiating and receiving elements.

FIG. 5 shows a fourth embodiment according to the invention from the back side of a conventional desktop PC 520 connected to a display 510 having an embedded antenna 500. Embedded antenna 500 includes multiple radiating and/or receiving elements. As shown in FIG. 5, two dipole elements of embedded antenna 500 are formed on an outer surface of display 510. In another example, the two dipole elements may be formed on a printed circuit board or boards located inside the display 510. For example, embedded antenna 500 may be etched on a printed circuit board that also contains the display's 510 control electronics.

The two elements of embedded antenna 500 are spaced to provide diversity to combat multipath propagation problems by, for example, having the receiver select the signal from the embedded antenna element that is receiving the strongest signal. As most radio signals propagate, they encounter reflections and other disturbances that cause the signals to travel many different paths, each with a different distance. The variance in propagation causes the signal to arrive at the receiving antenna element(s) in potentially problematic ways. For example, as the different paths traveled become different in length, the signals may interfere with each other in a destructive fashion (i.e. destructive interference, also called multipath effects). By separating the receiving antenna elements an appropriate distance (related to the wavelength of the signal to be received), it is possible to design a system in which one of the antenna elements will be in a position where the signal has not experienced significant degradation due to multipath effects. Such a use of two receiving elements separated by an appropriate distance is known as "spatial diversity." Alternatively, the two antenna elements may be configured to send/receive signals at different polarizations (i.e. left-hand circular for the left antenna element and right hand circular for the right antenna element), thereby achieving polarization diversity. Other diversity applications, such as frequency diversity, are also possible.

Antenna configurations for minimizing multipath and other interference problems are well known in the art and are more fully described in *Reference Data for Radio Engineers.* Although described with respect to the fourth embodiment, multiple antenna elements may be provided with any the embodiments described herein, including portable computers and PIDs.

According to the invention, multiple embedded antenna elements may be used to provide antennas with other desirable properties. For example, by interconnecting a series of radiating elements in an appropriate manner, it is possible to develop steerable antennas that are capable of transmitting and receiving information in certain directions while being "blind" or incapable of transmitting/receiving information from other directions. Techniques for forming steerable antennas are well known in the art and are more fully described in *Reference Data for Radio Engineers.*

An embedded steerable antenna configuration provides advantages, for example, for cell-based radio architectures (including PCS, cellular, and most wireless LAN standards) because the cell-based system can achieve higher capacities (more simultaneous users) through frequency reuse. Frequency reuse is a technique in which the geographical coverage is divided into several small cells. Each of the cells is assigned to specific frequencies of operation (or channels) and none of the adjacent cells can use the same channels. This allows the radio system operator to re-use channels or frequencies in cells further away, thereby providing higher capacities. Such techniques are more fully described in *Reference Data for Radio Engineers.*

Moreover, by appropriate placement of multiple embedded antenna elements in a computing device, the device can combine the benefits of transmitting and receiving information in a steerable fashion with the ability to operate as a diversity system to minimize the impact of multipath propagation.

It will be apparent to one skilled in the art that the antennas which are described in the foregoing embodiments according to the invention may be constructed in a variety of ways. Fabrication methods other than microstrip or strip-line techniques may be used. For example, a series of conductors may be etched, glued, or otherwise deposited onto a printed circuit board that can be easily placed inside a computing device as an adjunct board or on an existing board that is installed inside the computing device.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A computing device comprising:

an antenna embedded in the computing device to at least one of receive and transmit information from and to, respectively, an other device in the absence of a physical connection to said other device, wherein said antenna comprises a plurality of radiating and receiving elements and wherein said plurality of radiating and receiving elements are responsive to steering circuitry to form a directed antenna beam, and wherein said antenna is embedded on a back side of a housing on which a display module of said computing device is provided on a front side thereof.

2. The computing device as recited in claim 1, wherein said antenna is formed in at least one printed circuit board installed in said computing device.

3. The computing device as recited in claim 1, wherein said plurality of radiating and receiving elements are positioned spatially apart at predetermined distances to mitigate multipath effects.

4. The computing device as recited in claim 3, wherein said plurality of radiating and receiving elements are responsive to steering circuitry to form a directed antenna beam.

5. A portable computer comprising:

a base portion;

a display portion comprising an enclosure and a display area; and an antenna integrally formed on a printed circuit board housed within said enclosure of said display portion, to at least one of receive and transmit information from and to, respectively, an other device in the absence of a physical connection to said other device, wherein said antenna comprises a plurality of radiating and receiving elements, wherein said plurality of radiating and receiving elements are positioned spatially apart at predetermined distances to mitigate multipath effects, and wherein said plurality of radiating and receiving elements are responsive to steering circuitry to form a directed antenna beam.

6. The portable computer as recited in claim 5, wherein said antenna is embedded on a structure inside said enclosure.

7. The portable computer as recited in claim 6, wherein said structure is a printed circuit board.

8. A display module comprising an enclosure and an antenna integrally formed on a printed circuit board housed within said enclosure, to at least one of receive and transmit information from and to, respectively, an other device in the absence of a physical connection to said other device, wherein said antenna comprises a plurality of radiating and receiving elements, and wherein said plurality of radiating and receiving elements are responsive to steering circuitry to form a directed antenna beam.

9. The display module as recited in claim 8, wherein said plurality of radiating and receiving elements are positioned spatially apart at predetermined distances to mitigate multipath effects.

10. A personal computer, comprising:

a base portion that includes a front region on which a keyboard is provided and a back region on which a mounting bracket is provided, said mounting bracket being for mounting printed circuit boards to said base portion for coupling to said personal computer;

a display portion mounted to said base portion; and an embedded antenna formed on said mounting bracket, wherein embedded antenna provides for wireless communications to another device separate from said personal computer.

* * * * *